United States Patent [19]

Doncque

[11] 4,076,271
[45] Feb. 28, 1978

[54] VEHICLE WHEEL SUSPENSION DEVICE
[75] Inventor: Pierre M. Doncque, Amiens, France
[73] Assignee: Agence Nationale de Valorisation de la Recherche (ANVAR), Neuilly, France
[21] Appl. No.: 671,947
[22] Filed: Mar. 30, 1976
[30] Foreign Application Priority Data Apr. 3, 1975 France .................. 75 10462

[51] Int. Cl.² ............................................. B60G 15/00
[52] U.S. Cl. ...................................... 280/284; 180/32
[58] Field of Search ............ 180/32, 73 TL; 280/283, 280/284

[56] References Cited

U.S. PATENT DOCUMENTS

| 625,456 | 5/1899 | Mills | 280/284 |
|---|---|---|---|
| 657,667 | 9/1900 | Mills | 280/284 |
| 1,047,430 | 12/1912 | Michaelson | 280/284 |
| 3,974,892 | 8/1976 | Bolger | 180/32 |

FOREIGN PATENT DOCUMENTS

| 933,079 | 4/1948 | France | 280/284 |
|---|---|---|---|
| 907,380 | 3/1954 | Germany | 280/284 |
| 411,696 | 5/1945 | Italy | 280/284 |
| 483,886 | 8/1953 | Italy | 280/284 |
| 458,083 | 6/1950 | Italy | 280/284 |
| 432,075 | 3/1948 | Italy | 280/284 |

Primary Examiner—Joseph F. Peters, Jr.
Assistant Examiner—Terrance L. Siemens
Attorney, Agent, or Firm—Cushman, Darby & Cushman

[57] ABSTRACT

A vehicle wheel suspension device, for example for the rear wheel of a motor cycle, comprises a fork with two arms between which the wheel is mounted. The fork oscillates about its base and an intermediate solid serves as a base for buttressing connections extending from the vicinity of the free ends of the arms of the fork.

9 Claims, 8 Drawing Figures

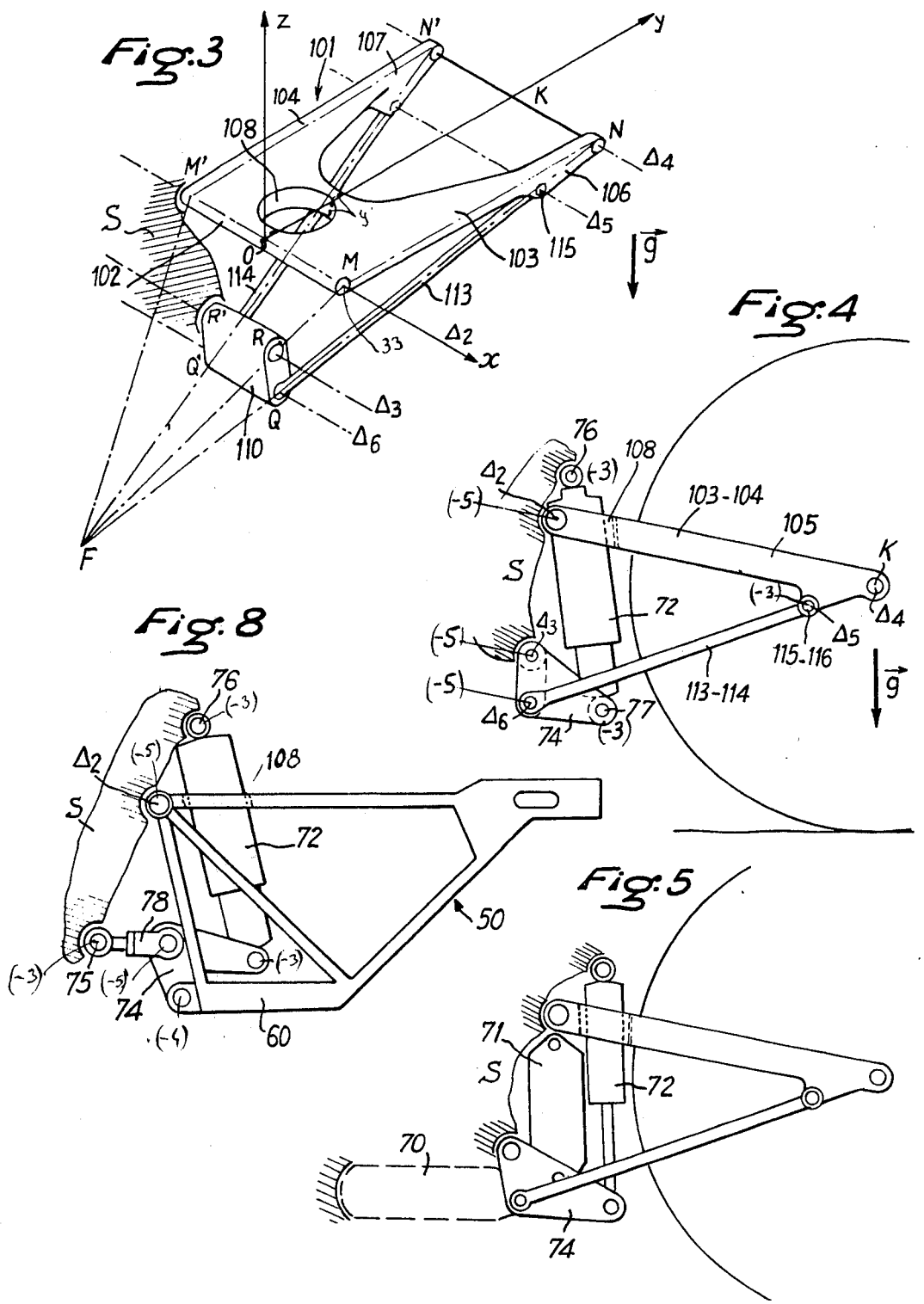

VEHICLE WHEEL SUSPENSION DEVICE

BACKGROUND OF THE INVENTION

1. Field of the Invention

The invention relates to a vehicle wheel suspension device which is very resistant to distortion and comprises two arms constituting an oscillating fork which oscillates relative to the body of the vehicle about an oscillation axis at the base of the fork, which fork carries a wheel axle or wheel pivot support at the free end of its arms.

In the following description, in order to avoid a lengthy explanation, the invention is illustrated with reference to the suspension of a motor cycle rear wheel. However, only minor modifications within the competence of the expert would be necessary to enable the arrangements described to be applied, as specified, to vehicles other than motor cycles or else to front wheels, in the latter case by simply substituting a wheel pivot support for the hub described.

2. Description of the Prior Art

The majority of swing arms for motor cycle rear wheel suspensions consist of forks made from forgings, sections, tubular parts, or box-shaped parts. Swing arms of these types are not suitable for high-performance machines. Machines of this kind in fact require the most perfect possible rigidity of connection between the axis of rotation of the rear wheel and the pivot axis of the swing arm. Because of their elasticity, known devices for mounting motor cycle rear wheels are not entirely free from twisting, which gives rise to dangerous stresses through resonance caused by irregularities of the track or road or the intrinsic action of the transmission. Also, the forked part, no matter how strong, will always have certain torsional elasticity.

A main object of the invention is to provide a very rigid swing arm which is free from the shortcomings indicated above, and is capable of being used either for a rear wheel suspension or for a pivot suspension for a steered vehicle wheel.

Another object of the invention is to provide a suspension which does not have the shortcomings indicated above, but which makes it possible to use a single suspension assembly and to locate that assembly in a position where there is usually an unused space.

SUMMARY

The invention provides a vehicle wheel suspension device comprising a fork with two arms between which the wheel is mounted. The fork oscillates relative to the vehicle body about an axis at the base of the fork, and the fork base is connected to an intermediate solid which acts as a base for buttressing connections which converge towards this solid from the vicinity of the free ends of the arms of the fork. The buttressing connections are connecting rods connected near to the free ends of the arms and to the base of the fork.

In a first embodiment, the intermediate solid is mounted on the body of the vehicle by pivoting articulation parallel to the oscillation axis of the fork, and the body of the vehicle itself serves as a buttressing connecting part between the intermediate solid and the base of the fork.

In another embodiment the intermediate solid is a rigid unitary part and is rigidly connected to the fork at least in the proximity of the two ends of the base of the fork and near the free ends of the branches of the fork by struts disposed substantially along the edges of a truncated pyramid converging substantially beyond the unitary part.

In this embodiment it is advantageous for the unitary part to be disposed in a lower position than the fork, for the edges of the truncated pyramids to converge in the downward direction, and for this unitary part to be a box-like member.

In all embodiments according to the invention at least one of the two parts comprising an elastic element and a shock-absorber element should connect by articulations the body of the vehicle to the intermediate solid, either directly or indirectly.

The invention thus achieves the proposed objects. Furthermore, it has the advantage of making it possible for the suspension spring or springs and the shock absorber system to be moved to a low part of the machine, in a protected zone hitherto unused. Consequently, the upper portion of the machine can be left free, for example so as to provide a larger fuel tank, thus further contributing towards the stability of the machine.

BRIEF DESCRIPTION OF THE DRAWINGS

FIG. 3 is a view in perspective of one embodiment of a suspension arm according to the invention, FIGS. 4 and 5 show two possible constructions of suspension device of the invention, utilising the preferred suspension arm of FIG. 3 combined in one piece with a rocker to be tied to a vehicle through an elastic element and/or shock absorber.

FIGS. 7 and 8 show two possible constructions of the suspension device of the invention, utilising the arm shown in FIG. 6.

DESCRIPTION OF THE PREFERRED EMBODIMENTS

Figure 1:
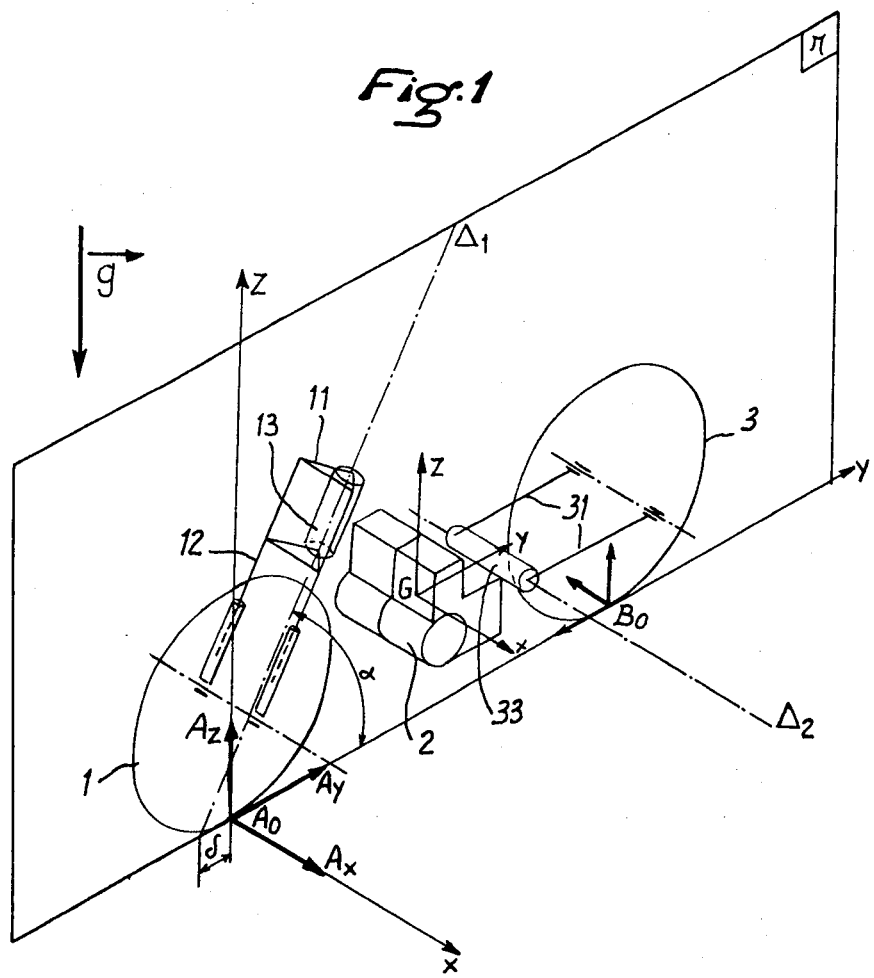
FIG. 1 illustrates diagrammatically the dynamic data involved in a motor cycle.

The dynamic elements of a motor cycle, which are shown diagrammatically in FIG. 1, are a front wheel 1 carried by a steering system 11 and a suspension 12, an engine unit 2 suspended on the frame, not shown in FIG. 1, and a rear wheel 3 carried by a swing arm 31. These elements are shown in relation to the plane of symmetry $\pi$ having a horizontal axis $A_{oy}$ and a vertical axis $A_{oz}$, in which $A_o$ is the point of contact of the front wheel with the ground.

The steering system 11 and the suspension 12 of the front wheel are carried by a steering column 13 having a rake $\alpha$. The steering column 13 which serves as a connection transmits the reciprocal forces of the front wheel assembly and engine unit which, together with the rider, has a centre of gravity G, and constitutes a shock-absorbing element.

Similarly, a suspension connection 32 for the rear wheel constitutes a connection having a horizontal axis of rotation 33 by which the reciprocal forces of the engine unit and rear wheel assembly are transmitted, the rear wheel bearing on the ground at $B_o$.

The dynamic elements applying forces to the connection between the rear wheel assembly and the engine, that is to say in practice, at the articulation of the horizontal axis between the frame and the swing arms 31, will now be considered.

Figure 2:
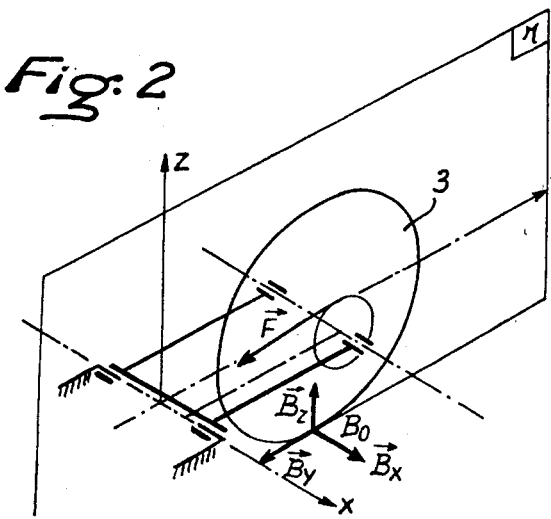
FIG. 2 shows diagrammatically the dynamic data involved in the rear wheel assembly of a motor cycle.

The transverse forces $B_x$ at the point $B_o$ of the rear wheel in contact with the ground, are translated into torsional forces on the axis $\Delta_2$ of articulation 33 of the rear arm (FIG. 2) on which the rear wheel 3 is mounted, the wheel 3 being driven for example by a chain applying a force F.

The invention provides a suspension arm resisting torsional forces and having the characteristics of the suspension device according to the invention, and also advantageous improvements.

A preferred embodiment of the invention will now be described with reference to FIGS. 3, 4 and 5.

A fork indicated generally at 101 comprises two arms 103 and 104 and a base 102 by which the fork pivots about a pivot axis 33 in two bearings located at M and M' on the frame forming the body of the motor cycle, this body being indicated by the hatched portion S.

The fork may consist of two arms which are articulated about an axis parallel to or coinciding with the axis $\Delta_2$, for example being separated therefrom by the line $y'$ shown as a dashed line in the plane Oyz in FIG. 3. Line $y'$ shows a possible separation of the fork 103 in two halves oscillating about $\Delta_2$.

The ends N and N' of the fork have reinforcing elements 106, 107 with apertures for fastening to a rear hub K having its axis $\Delta_4$ parallel to $\Delta_2$. This fork is reinforced over the whole of its inside periphery by a flat member 105 cut out for the passage of the wheel. This flat member also has an aperture 108 for the passage of a shock absorber, as will be explained later. The suspension device also comprises an intermediate solid 110 mounted for pivoting on the body S about two points R and R' which are aligned on an axis $\Delta_3$ parallel to the axis $\Delta_1$. This intermediate solid 110 serves as a buttressing base at two points Q and Q' which are aligned on an axis $\Delta_6$ which is parallel to R, R', for the ends N and N' of the fork, through two connecting rods 113 and 114 which are directed substantially towards the axis K of the hub. The axis $\Delta_6$ is parallel to R, R'. Each of the connecting rods 113 and 114 is connected to the corresponding arm 103, 104 of the fork 101 at an articulation point 115, 116, and two points, respectively 115 and 116, which points 115 and 116 are disposed on an axis $\Delta_5$ parallel to the axes $\Delta_2$, $\Delta_3$, $\Delta_4$, and $\Delta_6$. In this way the straight lines of action of the connecting rods 113 and 114 converge towards a point F situated beyond the solid 110, so that all the forces applied to the fork are distributed by the straight lines of action NF, N'F, MF, M'F, which form a pyramid having as base the four connection points M, M', N, N' of the fork.

From the above description it can be seen that the fork 105 considered by itself, has only slight torsional rigidity about the axis Oy, but by embodying the features of the invention the suspension assembly of which the fork forms part has very great torsional rigidity about the same axis Oy, due to the fact that the connection ponts M, N, M', N' form part of a structure in space having no resultant degree of freedom.

FIG. 4 illustrates a preferred arrangement of the device of the invention in a motor cycle having a single elastic suspension member constituting a shock absorber 72. The intermediate solid consists of a solid box having the secondary function of a rocker. The shock absorber 72 is connected by an articulation 77 to the rocker 74 and by an articulation 76 to the body S. The degrees of freedom of each of the articulations have been shown in FIG. 4, namely the articulations on pins having a single degree of freedom are marked (−5), that is to say about axes $\Delta_2$, $\Delta_3$, and $\Delta_6$, and the spherical articulations having three degrees of freedom, marked (−3), that is to say at 76, 77 and about axis $\Delta_5$.

In FIG. 4 the shock absorber 72 passes through the opening 108 in the fork 105, but the shock absorber may also be fastened on the axis $\Delta_2$.

The arrangement shown in FIG. 4 utilises a single, substantially vertical, long-stroke shock absorber in a protected zone which hitherto was unused in wheel suspension devices. Great stiffness of transmission and the low masses of the mechanism are thus achieved for effective shock absorption. There is no risk of buckling of the connecting rods, which work under tension. Ground clearance remains practically that of the engine. In the case of a motor cycle the stand can use the axis $\Delta_3$.

The modified embodiment shown in FIG. 5 differs from that shown in FIG. 4 in that a short-stroke vertical spring 71 or horizontal short-stroke spring 70 is added to the shock absorber 72 in order to suspend the device elastically between the body S and the rocker 74. The embodiment shown in FIG. 5 is suitable for motor cycles designed for speed racing.

Figure 6:
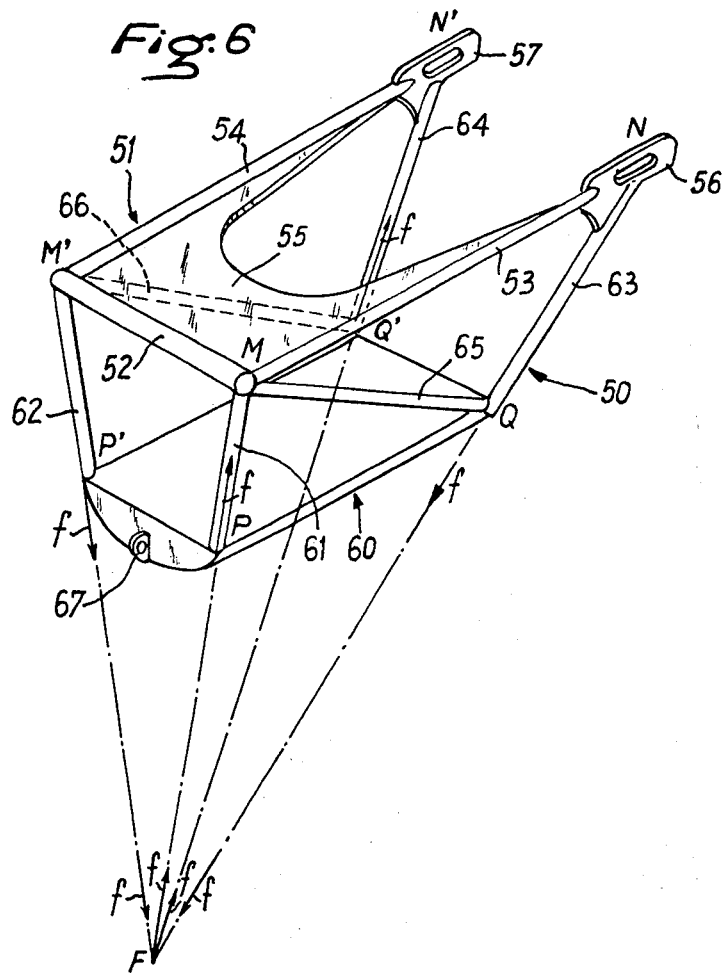
FIG. 6 is a view in perspective of another embodiment of suspension arm according to the invention.

FIGS. 6 and 8 show another embodiment of the invention.

In FIG. 6 a fork 51 is shown, which comprises a tube 52 which serves as end articulation axis M, M', and two straight tubes 53, 54 each of which is welded at one end to the tube 52, and which constitute the two arms MN and M'n' of the fork 51. At its ends N and N' the fork 51 carries reinforcing parts 56, 57 having apertures for fastening the hub of a motor cycle rear wheel. Over its entire inner periphery this fork 51 is reinforced by a flat piece 55 which is cut out for the passage of the wheel. In addition, the suspension arm 50 is provided with a member 60 consisting of a substantially rectangular welded box to which all the torsional forces of the fork 51 are transmitted by means of welded tubes 61, 62, 63, 64 connecting the four apices P, P', Q, Q' of the box 60 respectively to the aforesaid points M, M', N, N'.

In order that the torsional forces may be effectively transmitted to the box 60, that is in order that this box may contribute towards the torsional resistance of the fork M, M', N, N', which would be twistable if other precautions were not taken, the assembly comprising the fork 51, the box 60, and the tubes 61, 62, 63, 64 defines a truncated pyramid having an imaginary apex F situated below the level of the plane of contact of the wheels with the ground and in the axis of symmetry of the machine.

It will be understood that any torsional force on the fork 51 will produce in the tubes 61 to 64 longitudinal forces which are symbolized by the arrows $f$, the forces system applied to the four tubes 61 to 64 would induce no resultant force at the apex F. The rigid character of the box 60 which withstands torsional forces enables the fork 51 to withstand these forces.

It will be understood that the box will better withstand the forces if it has a cross-section PP'Z in the form of an arc and secant, in which the arcuate portion of the box is directed downwards (increased resistance to torsion which may be produced by the forces symbolised by the arrows $f$).

It is advantageous for the whole structure to be reinforced by triangulation, by welding reinforcing tubes 65, 66 between the points MQ and M'Q'.

Figure 7:
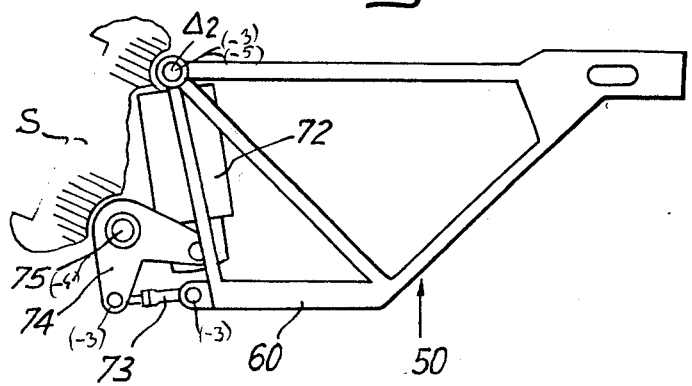

FIGS. 7 and 8 illustrate two constructions of suspension device according to the invention, in which the arm shown in FIG. 6, which is indicated generally by 50, has been found particularly advantageous.

FIG. 7 shows diagrammatically an embodiment in which the front of the box 60 is connected to the bottom point of a single vertical shock absorber 72 by means of a linkage comprising an adjustable connecting rod 73 and a rocker 74 which is articulated to a bottom point 75 of the body of the vehicle. The top of the shock absorber is fastened on the axis $\Delta_2$ of oscillation of the fork on the body of the vehicle. The degrees of freedom of the articulations have been represented with the same notation as in FIG. 4.

The embodiment shown in FIG. 8 is preferred to that shown in FIG. 7, since it makes it possible for the use of conventional long-stroke shock absorber, with simple, inexpensive connections, and maximum saving of space, for example for the exhaust pipes.

For this purpose the rocker 74 is mounted for rocking on the end of a connecting rod 78 which is articulated to a bottom point 75 of the vehicle body. Two free ends of the rocker 74 are respectively connected by articulations to the rear of the box 60 and to the bottom point of a shock absorber 72 which is suspended at 76 on the body of the vehicle. The degrees of freedom of the articulations are shown in the Figure in accordance with the same notation as previously.

I claim:

1. A motorcycle rear wheel suspension device which is resistant to distortion comprising two arms constituting a fork having an articulated base, which fork oscillates relative to the body of the motorcycle about an oscillation axis at the base of the fork, the free ends of the arms of the fork being adapted for carrying a wheel axle or wheel pivot support; and an intermediate solid lower than said fork and serving as base for connecting rods which converge substantially into proximity with this solid; at least two rods being connected at separated locations to said intermediate solid and each connected to one of the arms of the fork near the free end of the respective arm, each connecting rod extending substantially towards the wheel axle or wheel pivot support, said solid also being connected to the base of the fork.

2. A motorcycle wheel suspension device according to claim 1, wherein the intermediate solid is mounted on the body of the motorcycle by pivoting articulation parallel to the oscillation axis of the fork, and this solid comprises at least one connection point for said rods spaced from its oscillation axis.

3. A motorcycle wheel suspension device according to claim 1, including a rigid unitary part connected to the fork at least in the proximity of the two extremities of the base of the fork and near the free ends of the arms, by struts disposed substantially along the edges of a truncated pyramid converging substantially beyond the unitary part in the plane of the symmetry of the device.

4. A device according to claim 3, wherein the unitary part is disposed in a lower position than the fork and the edges of the truncated pyramid converge in the downward direction.

5. A device according to claim 1, including at least one of two parts comprising an elastic element and a shock absorber element connecting by articulations the body of the vehicle to the intermediate solid, directly by means of a rocker.

6. A device according to claim 1, wherein the point of connection by articulation of a suspension element to the body of the motorcycle is situated on the articulation axis of the fork.

7. A device according to claim 1, wherein the fork has a passage for a suspension element connected by articulation to the body of the motorcycle beyond the fork relative to the intermediate solid.

8. A device according to claim 5, wherein the intermediate solid is connected to the body of the motorcycle by at least one elastic element and at least one shock absorber element.

9. A device according to claim 1, including at least one of two parts comprising an element connecting by articulations the body of the motorcycle to the intermediate solid, by means of a rocker.

* * * * *